United States Patent [19]

Stankos et al.

[11] 4,261,640
[45] Apr. 14, 1981

[54] IN-LINE OPTIC ATTENUATORS FOR OPTICAL FIBERS

[75] Inventors: William C. Stankos; James R. MacLean, both of Melbourne, Fla.

[73] Assignee: Harris Corporation, Melbourne, Fla.

[21] Appl. No.: 26,604

[22] Filed: Apr. 3, 1979

[51] Int. Cl.³ .............................................. G02B 5/14
[52] U.S. Cl. ............................. 350/96.15; 350/96.2; 350/96.21
[58] Field of Search .................. 350/96.15, 96.21, 96.2; 250/227, 211 K; 333/23, 28 R

[56] References Cited

U.S. PATENT DOCUMENTS

| | | | |
|---|---|---|---|
| 1,479,051 | 1/1924 | Best | 333/23 |
| 2,256,595 | 9/1941 | Metcalf | 250/227 |
| 2,324,304 | 7/1943 | Katzman | 250/227 |
| 3,255,357 | 6/1966 | Kapany et al. | 250/227 |
| 3,639,769 | 2/1972 | Clark | 250/211 K |
| 3,706,053 | 12/1972 | Iwakami | 333/23 |
| 3,944,327 | 3/1976 | Larsen . | |
| 3,995,935 | 12/1976 | McCartney . | |
| 4,087,158 | 5/1978 | Lewis et al. | 350/96.21 |
| 4,118,105 | 10/1978 | Voigt | 350/96.2 |
| 4,121,884 | 10/1978 | Greenwood | 350/96.15 |

Primary Examiner—Alfred E. Smith
Assistant Examiner—T. N. Grigsby
Attorney, Agent, or Firm—Craig & Antonelli

[57] ABSTRACT

In testing systems using fiber optic lengths, it is desirable to have means to simulate long lengths of such fiber optic lengths. To accomplish this, a device and a method are provided for holding first and second optic fibers which have a combined attenuation less than that which it is desired to simulate. An optical attenuator is then inserted between respective ends of said first and second optic fibers. The degree of attenuation of the optical attenuator is set to correspond to the attenuation of the length to be simulated minus the combined attenuation of the first and second optic fibers. In most testing situations, the attenuation of the first and second fibers is negligible in comparison with the much longer length of optic fiber being simulated, so that essentially the entire attenuation is provided by the optical attenuator. In addition to being used to simulate long length optic fibers for test conditions, the method and device can also be used to equalize the attenuation of optic fibers running in parallel with each other where the optic fibers have different degrees of attenuation.

29 Claims, 3 Drawing Figures

IN-LINE OPTIC ATTENUATORS FOR OPTICAL FIBERS

FIELD OF THE INVENTION

This invention relates generally to optic fibers, and, more particularly, to a method and device for attenuating light signals passing between two lengths of single optic fiber.

BACKGROUND OF THE INVENTION

In designing systems using fiber optic lengths, it is frequently necessary to test the operation of various components of the system prior to installation. Previously, to accomplish this in a lab or test facility, it was necessary to provide a full length fiber optic length equilvalent to the actual fiber optic length which is to be used in the installed system. This could be extremely cumbersome since installed systems frequently cover several miles. Thus, the fiber optic length was typically wound on a large mandrel which occupied a great deal of space in the laboratory or test facility.

A related problem in the actual utilization of a system with fiber optic lengths is that single fiber optic lengths frequently must be run parallel to one another. This can create difficulties if the single fiber optic lengths do not have the same degree of attenuation since the output signal of one fiber optic length will differ from the output signal of a parallel length.

SUMMARY OF THE INVENTION

It is an object, therefore, of the present invention to provide a method and device for testing systems using fiber optic lengths with means to simulate the full length of the fiber optic length.

It is a further object of the present invention to provide an arrangement for equalizing the attenuation in parallel single fiber optic lengths.

To accomplish these and other objects, a method and device are provided for holding first and second optic fibers located with an end of the first fiber facing an end of the second fiber. An optical attenuator is coupled between these facing ends with the end of the first fiber adjacent to a first surface of the optical attenuator, and the end of the second optical fiber adjacent to a second surface of the attenuator which is parallel to the first surface.

BRIEF DESCRIPTION OF THE DRAWING

These and other objects and advantages of the present invention will be apparent from the following detailed description and drawing wherein.

DETAILED DESCRIPTION

Figure 1:
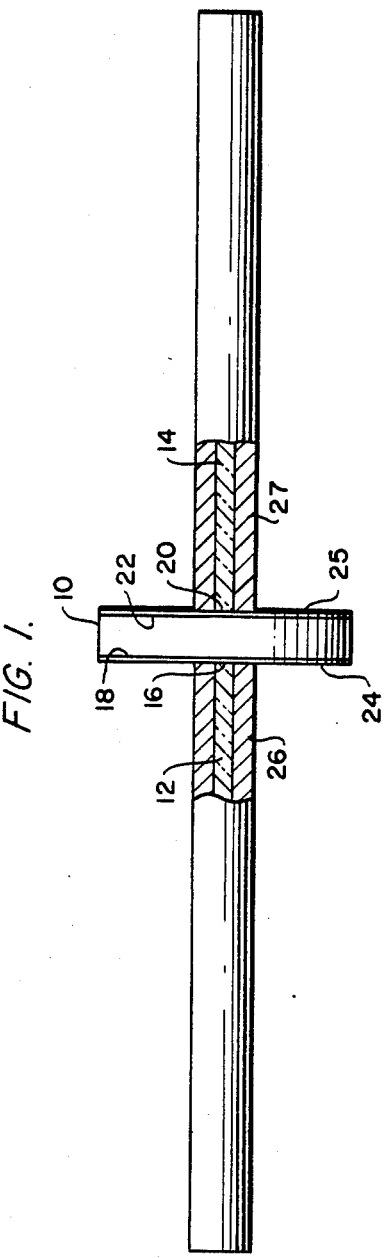
FIG. 1 shows a side view, partly in section, illustrating the basic concept of the invention.

Referring now to the drawing, FIG. 1 shows the basic concept of the invention in providing an optical attenuator, shown here as a light absorbing filter disc 10, coupled between a first optic fiber 12 and a second optic fiber 14. The filter disc 10 may be cylindrical, or any other convenient shape. The coupling is done so that an end 16 of the first optic fiber 12 is adjacent to a first surface 18 of the filter disc 10, while an end 20 of the second optic fiber 14 is adjacent to a second surface 22 of the filter disc 10. The first and second surfaces 18 and 22 are parallel to one another so that the facing ends 16 and 20 of the optic fibers can be directly in line with one another to insure maximum light transfer between them.

The coupling is accomplished by means of layers of a matching gel 24 and 25 which are coated respectively on the first and second surfaces 18 and 22 of the filter disc 10. A typical material for such a matching gel is "Silicon Matching Gel" which is sold by Math Associates.

As is presently conventional in the manufacture of optic fibers, stainless steel tubes 26 and 27 are provided around each of the optic fibers 12 and 14, respectively, for protective purposes.

The filter disc 10 may be manufactured, by way of example, by using a piece of exposed photographic film. The amount of exposure of the film determines the degree of attenuation to light. Thus, by controlling the degree of exposure of the photographic film, it is possible to set the attenuation of the film to equal that of any length of optic fiber desired. Such photographic film, as well as the means for exposing it to a desired degree, are well known.

In simulating a long length of optic fiber for test purposes, it is generally desirable to use short pieces 12 and 14 of optic fiber having a negligible attenuation in comparison with the length which is simulated. Such an arrangement takes up a minimum of test facility space. In such a case, the entire amount of desired attenuation can then be accomplished by exposing the photographic film making up the filter disc 10 to a degree sufficient to equal the desired attenuation of the simulated length of optic fiber.

On the other hand, in equalizing the attenuation of one length of optic fiber in regard to another parallel length of optic fiber having a greater attenuation, it is generally necessary to take the attenuation of the first optic fiber into account. Accordingly, the amount of attenuation of the filter disc is set to equal the difference in the attenuation between the parallel optic fibers.

The attenuator disc 10 must generally be quite thin since the light beam will tend to disperse in the disc as it passes between the ends 16 and 20 of the fibers 12 and 14. If the dispersion is great enough, it will cause multiple path lengths and possibly multimode pickup in the receiving optic fiber, thereby creating pulse distortion in the optical path. To avoid this, it is generally desirable to keep the thickness of the disc between the surfaces 18 and 22 in the region of 100 microns or less if conventional photograph film is used. This presents no problem in using conventional film since it is generally available in thicknesses of approximately four thousandths of an inch. By using film this thin, significant beam dispersion is avoided so that the majority of light passes from one fiber to the other. Of course, the thickness of the matching gel layers 24 and 25 must be kept as low as possible for the above reasons.

Figure 2:
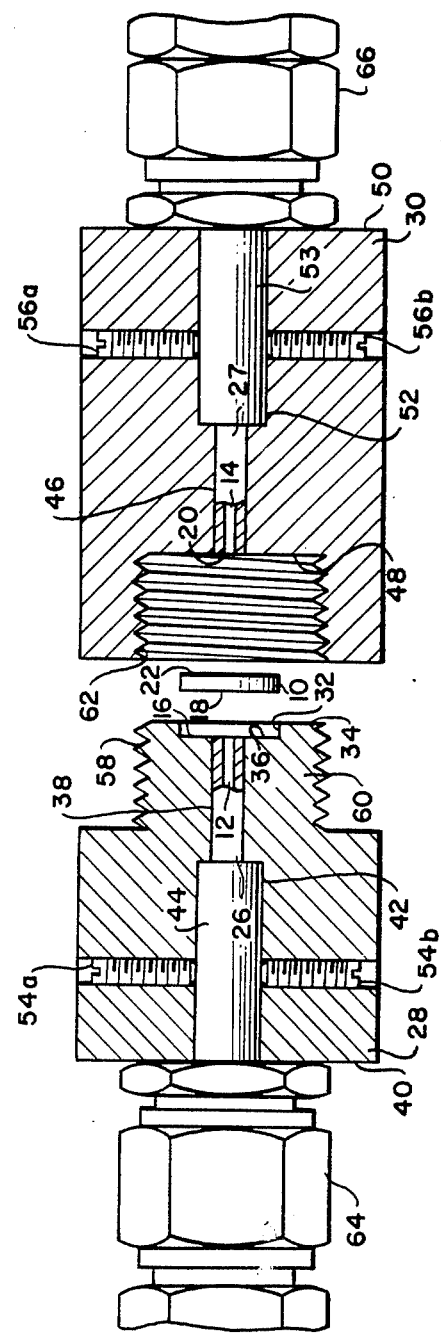
FIG. 2 shows a side view, partly in section, of an embodiment of the present invention including holding members for coupling the optic fibers and optical attenuator together, wherein the holding members are disengaged and the filter disc is not inserted.
Figure 3:
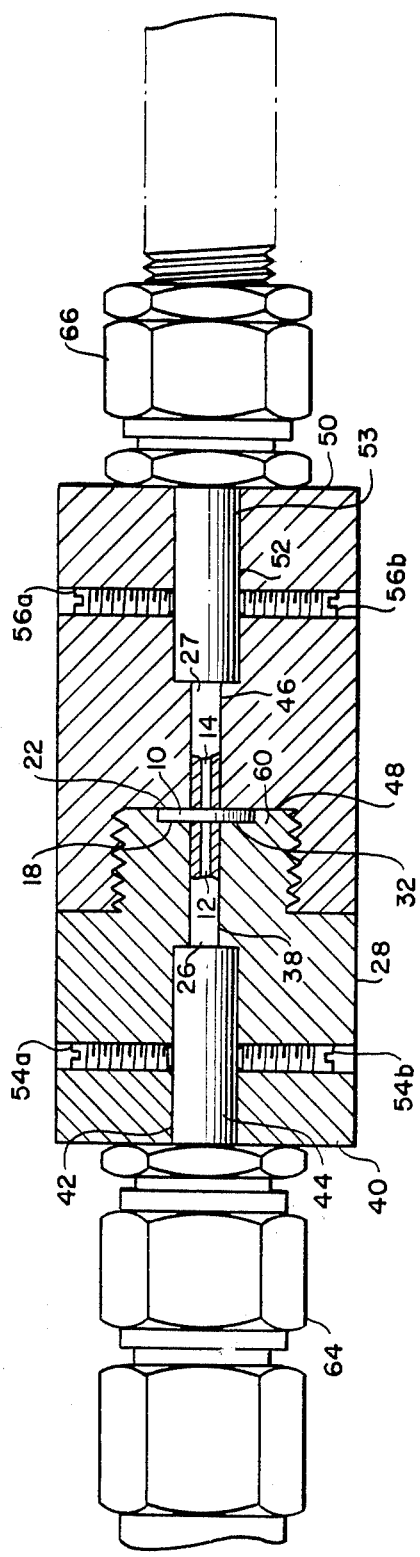
FIG. 3 shows a side view, partly in section, of the assembled device.

Referring now to FIGS. 2 and 3, wherein like numbers designate like elements, a practical embodiment for coupling the optic fibers 12 and 14 and the filter disc 10 is shown. As can be seen, the first fiber 12 and the filter disc 10 are held in a first holder 28, while the second fiber 14 is held in a second holder 30. The filter disc 10 is located in a depression 32 in an end surface 34 of the first holder 28 so that the first surface 18 of the filter disc 10 rests on a recessed surface 36 formed by the depression. The second surface 22 of the filter disc 10 faces outward from the first holder 28 toward the second holder 30. To provide for secure holding, the shape of the depression 32 should conform to the shape of the filter disc 10. Typically, a cylindrical shape is convenient for both the disc 10 and the depression 32 since such cylindrical shapes are relatively easy to machine. But, of course, the invention in not limited to this shape. As can be seen from FIG. 3, the depth of the depression 32 is also generally set to correspond to the thickness of the filter disc 10 so that the second surface 22 of the filter disc 10 will be even with the end surface 34 of the first holder 28.

The first holder 28 is also provided with an opening 38 extending along the longitudinal axis of the first holder from the recessed surface 36 to an opposite end surface 40 of the first holder. This opening 38 serves to hold the first optic fiber 12 in its stainless steel tube 26 with its end 16 abutted against the surface 18 of the filter disc 10. To provide for maximum contact alignment, the opening 38 should be perpendicular to the plane of the recessed surface 36. It should be noted that a portion 42 of the opening 38 is enlarged to accommodate a protective sheath 44 formed around the stainless steel tube 26.

The second holder 30 is also provided with an opening 46 for holding the second optic fiber 14. This opening 46 extends along the longitudinal axis of the second holder 30 from a recessed end surface 48 of the second holder facing the end surface 34 of the first holder to an opposite end surface 50 of the second holder. And, as in the case of the opening 38, the opening 46 also includes an enlarged portion 52 for a protective sheath 53 of the second optic fiber 14. The second optic fiber 14 is held in the opening 46 so that its end 20 is even with the recessed end surface 48.

To hold both the first and second optic fibers 12 and 14 securely in their respective openings 38 and 46, set screws 54a, 54b, 56a and 56b are provided to extend through the wall of the holders 28 and 30 to press against the protective sheaths 44 and 53. These set screws 54a, 54b, 56a and 56b prevent both rotational and longitudinal movement of the fibers 12 and 14 relative to the holding numbers 28 and 30.

Coupling the first and second holders 28 and 30 together can be conveniently accomplished by using external threading 58 on a cylindrical portion 60 of reduced diameter of the first holder 28 and matching internal threading 62 along the cylindrical wall leading to the recessed end surface 48 of the second holder 30. Alternately, an internally threaded collar could be used to slip over cylindrical portions on the exteriors of the first and second holders 28 and 30 to couple them together. And, of course, any other conventional means other than screw threading could be used to couple the first and second holders 28 and 30 together.

To allow for convenient coupling of the optic fibers 12 and 14 in the first and second holders 28 and 30 with external optic fibers or other optical equipment, conventional fiber optic connectors having internally threaded collars 64 and 66 are respectively provided on opposite ends 40 and 50 of the first and second holders. If the device is to be used to equalize the total attenuation of one fiber optic length with that of a parallel length, the first length can be cut in two and provided with conventional connectors on each of the severed ends to match these fiber optic connectors.

A significant advantage of the present invention is the simple an inexpensive construction of the device. Also, the filter disc 10 can be readily interchanged simply by decoupling the first and second holders 28 and 30 from one another, removing the filter disc 10 and installing a new filter disc 10 having a different degree of attenuation, and recoupling the first and second holders.

Although the above described optical attenuator uses a photographic film for the filter disc 10, it should be understood that other forms of optical attenuations such as glass or plastic filters could be used. However, if such other types are used, they must be thin enough to avoid any significant beam dispersion, as discussed above. In this regard, it should be noted that a shape other than a disc could also be used, if desired, as long as the total thickness between the first and second parallel surfaces 18 and 22 is not so great as to cause significant beam dispersion.

It should also be noted that although the above discussion sets forth that the device is assembled by coating both sides of the filter disc 10 with matching gel layers 24 and 25 prior to assembly, it is, of course, possible to instead coat the ends 16 and 20 of the optic fibers 12 and 14 with matching gel prior to assembly.

Of course, it is to be understood that the above description of the invention is only illustrative of the principles of the invention, and that one with ordinary skill in the art could readily devise numerous modifications of the invention without departing from its spirit and scope.

What is claimed is:

1. A device comprising:
   means for holding first and second optic fibers with a space between them and with ends of the first and second optic fibers in line with one another; and
   an optical attenuator located in said space such that said optical attenuator will be between the ends of first and second optic fibers placed in said holding means with the end of said first optic fiber adjacent to a first surface of said optical attenuator and the end of said second optic fiber adjacent to a second surface of said optical attenuator, wherein said optical attenuator is comprised of a thin film and further wherein the space between the fiber ends and the thickness of the thin film are sufficiently small so that a majority of light passing through one fiber and through the thin film will enter the other fiber and so that light pulse distortion is minimized.

2. A device according to claim 1 wherein the means for holding further comprises:
   a first holder having an end surface with a depression therein forming a recessed surface for holding said attenuator with the first attenuator surface facing the recessed surface and the second attenuator surface facing outward from said holder, and an opening extending from said recessed surface to an external portion of said first holder for holding said first optic fiber with the end thereof abutting to the first attenuator surface, and a second holder having an opening extending from an end surface of the second holder to an external portion of the second holder for holding the second optic fiber with the end thereof adjacent to the end surface of the second holder, wherein said first and second holders are coupled to one another so that the end surfaces thereof are adjacent to one another so that said second optic fiber is abutting the second surface of said attenuator.

3. A device according to claim 2 wherein the end surface of the first holders is a flat surface parallel to the second surface of the attenuator.

4. A device according to claim 2 further comprising means for fixing said first and second optic fibers in their respective openings in the first and second holders to prevent movement of the optic fibers relative to the tholders.

5. A device according to claim 2 wherein the attenuator is a cylindrical disc and the depression in the end surface of the first holder is a cylindrical depression.

6. A device according to claim 5 wherein the attenuator includes a layer of matching gel on each of the first and second surfaces of the attenuator for coupling to said first and second optic fibers.

7. A device according to claim 6 wherein the matching gel is a silicon-base matching gel.

8. A device according to claim 2 wherein the first holder includes an externally threaded portion perpendicular to the end surface of said first holder, and the end surface of the second holder is in a depression having an internally threaded portion to match the externally threaded portion of said first holder so that said first and second holders are coupled together by said matching threaded portions.

9. A device according to claim 8 wherein said openings in said first and second holders extend parallel to the longitudinal axis of said first and second holders.

10. A device according to claim 9 wherein said first and second holders are cylindrical and said openings in said first and second holders extend concentrically along the longitudinal axis of the cylindrical holders.

11. A device according to claim 8 wherein the depth of the depression in the end surface of the first holder corresponds to the thickness of the attenuator between the first and second surfaces thereof.

12. A device according to claim 11 where in the depth of the depression is 100 microns or less.

13. A device comprising:
a first optic fiber;
a second optic fiber; and
an optical attentuator coupled between said first and second optic fibers with an end of said first optic fiber adjacent to a first surface of said optical attenuator and an end of said second optic fiber adjacent to a second surface of said optical attenuator such that said ends of said first and second optic fibers are in line with one another with said optical attenuator in between said ends, wherein said optical attenuator is comprised of a thin film and further wherein the space between the fiber ends and the thickness of the thin film are sufficiently small so that a majority of light passing through one fiber and through the thin film will enter the other fiber and so that light pulse distortion is minimized.

14. A device according to claim 1 or 13 where said optical attenuator has a value of attenuation set to equal the attenuation of a predetermined length of optic fiber.

15. A device according to claim 1 or 13 wherein said attenuator is a disc.

16. A device according to either claim 1 or 13 wherein said attenuator is made of an exposed photographic film.

17. A device according to claim 1 or 13 wherein said first surface of said optic attenuator is parallel to said second surface.

18. A device according to claim 17 wherein the thickness of said attenuator disc between said first and second surfaces is 100 microns or less.

19. A method comprising:
holding first and second optic fibers with ends of said first and second optic fibers spaced apart and in line with one another; and
attenuating light signals passing between the in-line ends of said first and second optic fibers by passing them through an optical attenuator inserted between the ends of said first and second optic fibers, wherein said optical attenuator is comprised of a thin film and further wherein the space between the fiber ends and the thickness of the thin film are sufficiently small so that a majority of light passing through one fiber and through the thin film will enter the other fiber and so that light pulse distortion is minimized.

20. A device comprising:
a first optic fiber having a predetermined attenuation along its length; and
one or more optic fibers arranged in parallel to said first optic fiber, wherein each of said one or more optic fibers comprises:
first and second optic fiber portions located with an end of said first optic fiber portion facing an end of said second optic fiber portion wherein the total attenuation along the combined length of said first and second optic fiber portions is less than the predetermined attenuation of said first optic fiber; and
an optical attenuator coupled between said facing ends of said first and second optic fiber portions with said end of said first optic fiber portion adjacent to a first surface of said optical attenuator and said end of said second optic fiber portion adjacent to a second surface of said optical attenuator which is parallel to said first surface, wherein the attenuation of said optical attenuator is set to correspond to the predetermined attenuation of the first optic fiber minus the total attenuation of the first and second optic fiber portions so that the attenuation between the first optic fiber and the one or more optic fibers arranged in parallel to said first optic fiber is equalized.

21. A device dependent on claim 20 wherein the attenuation of the first and second optic fiber portion is negligible in comparison to the predetermined attenuation of the simulated optic fiber so that the attenuation of the optical attenuator is set to equal said predetermined attenuation.

22. A method of simulating an optic fiber of a predetermined length comprising:
predetermining the amount of attenuation which would be present in an optic fiber of the length being simulated;
holding first and second optic fibers with ends of said first and second optic fibers in line with one another, wherein the total attenuation of said first and second optic fibers is less than the predetermined attenuation of the optic fiber of predetermined length to be simulated; and
attenuating light signals passing between the in-line ends of said first and second optic fibers by an amount equal to the difference between the attenuation of the length of optic fiber being simulated and the total attenuation of the first and second optic fibers.

23. A method according to claim 22 wherein the light signals are attenuated by passing them through an exposed photographic film inserted between the ends of said first and second optic fibers.

24. A method according to claim 22 wherein the attenuation of the first and second optic fibers is negligible in comparison to the predetermined attenuation of the simulated optic fiber so that the attenuation of the light signals is set to equal said predetermined attenuation.

25. A method according to claim 22, wherein said optical attenuator is comprised of a thin film and further wherein the space between the fiber ends and the thickness of the thin film are sufficiently small so that a majority of light passing through one fiber and through the thin film will enter the other fiber and so that light pulse distortion is minimized.

26. A device for simulating an optic fiber of a predetermined length comprising:
  means for simulating the predetermined length of optic fiber by providing an optical attenuation equal to a predetermined optical attenuation which occurs in such a length of optic fiber, comprising:
  first and second optic fibers located with an end of said first optic fiber facing an end of said second optic fiber wherein the total attenuation of said first and second optic fibers is less than the predetermined attenuation of the length of optic fiber to be simulated; and
  an optical attenuator coupled between said facing ends of said first and second optic fibers with said end of said first optic fiber adjacent to a first surface of said optical attenuator and said end of said second optic fiber adjacent to a second surface of said optical attenuator,
  wherein the attenuation of the optical attenuator is set to correspond to the attenuation of the predetermined length of optic fiber minus the total attenuation of the first and second optic fibers.

27. A device according to claim 26, wherein said optical attenuator is comprised of a thin film and further wherein the space between the fiber ends and the thickness of the thin film are sufficiently small so that a majority of light passing through one fiber and through the thin film will enter the other fiber and so that light pulse distortion is minimized.

28. A device according to claim 26 wherein said first surface of said optical attenuator is parallel to said second surface.

29. A device according to claim 28 wherein the attenuation of the first and second optic fibers is negligible in comparison to the predetermined attenuation of the simulated optic fiber so that the attenuation of the optical attenuator is set to equal said predetermined attenuation.

* * * * *